(12) United States Patent
Wang et al.

(10) Patent No.: US 11,681,329 B2
(45) Date of Patent: Jun. 20, 2023

(54) ELECTRONIC DEVICE ASSEMBLY

(71) Applicant: Acer Incorporated, New Taipei (TW)

(72) Inventors: Yu-Shih Wang, New Taipei (TW);
Yi-Ta Huang, New Taipei (TW);
Chih-Chun Liu, New Taipei (TW);
Cheng-Nan Ling, New Taipei (TW);
Wen-Chieh Tai, New Taipei (TW);
Chi-Hung Lai, New Taipei (TW);
Wu-Chen Lee, New Taipei (TW);
Pin-Chueh Lin, New Taipei (TW);
Chih-Wei Liao, New Taipei (TW);
Ting-Wen Pai, New Taipei (TW);
Wen-Chieh Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/719,315

(22) Filed: Apr. 12, 2022

(65) Prior Publication Data
US 2022/0236766 A1    Jul. 28, 2022

Related U.S. Application Data

(62) Division of application No. 16/905,922, filed on Jun. 19, 2020, now Pat. No. 11,334,115.

(30) Foreign Application Priority Data

Jan. 17, 2020 (TW) ................................ 109200733

(51) Int. Cl.
*G06F 1/16* (2006.01)
*H01R 13/62* (2006.01)
*H01R 13/26* (2006.01)
*H01R 13/24* (2006.01)

(52) U.S. Cl.
CPC .......... *G06F 1/1632* (2013.01); *G06F 1/1656* (2013.01); *G06F 1/1616* (2013.01); *G06F 1/1626* (2013.01); *H01R 13/24* (2013.01); *H01R 13/26* (2013.01); *H01R 13/6205* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,768,163 A | * | 6/1998 | Smith, II | G06F 1/1601 361/679.28 |
| 5,781,177 A | * | 7/1998 | Helot | G06F 1/1616 398/118 |
| 6,178,087 B1 | * | 1/2001 | Cho | G06F 1/1656 312/223.1 |
| 6,525,932 B1 | * | 2/2003 | Ohnishi | G06F 1/1616 361/756 |
| 6,587,151 B1 | * | 7/2003 | Cipolla | G06F 1/1607 D16/202 |

(Continued)

*Primary Examiner* — Lisa Lea-Edmonds
(74) *Attorney, Agent, or Firm* — JCIPRNET

(57) ABSTRACT

An electronic device assembly is provided, including an electronic device body and a detachable lens module. The electronic device body has a housing and a first joining unit, wherein the first joining unit is disposed on the housing. The detachable lens module is detachably assembled onto the housing and has a second joining unit, wherein the first joining unit is joined to the second joining unit to electrically connect the detachable lens module to the electronic device body.

3 Claims, 7 Drawing Sheets

(56) References Cited

U.S. PATENT DOCUMENTS

| | | | | |
|---|---|---|---|---|
| 6,812,958 B1* | 11/2004 | Silvester | ............... | G06F 1/1607 |
| | | | | 348/E5.026 |
| 7,061,536 B2* | 6/2006 | Cha | ....................... | G06F 1/1637 |
| | | | | 348/376 |
| 7,286,181 B2* | 10/2007 | Cha | ....................... | G06F 1/1637 |
| | | | | 348/374 |
| 7,595,981 B2* | 9/2009 | Chen | ..................... | G06F 1/1656 |
| | | | | 455/518 |
| 8,203,646 B2* | 6/2012 | Fan | ..................... | H04N 5/2252 |
| | | | | 348/207.1 |
| 9,571,708 B2* | 2/2017 | Haddad | .................... | G03B 9/08 |
| 10,234,909 B2* | 3/2019 | Youm | .................. | H04N 5/2254 |
| 10,416,709 B2* | 9/2019 | Hu | ....................... | F16M 11/048 |
| 10,645,285 B2* | 5/2020 | Yang | ................... | H04N 5/2252 |
| 10,728,449 B2* | 7/2020 | Yang | ................... | H04N 5/2251 |
| 10,775,841 B2* | 9/2020 | Chiu | .................... | G06F 1/1605 |
| 11,150,690 B2* | 10/2021 | Franke | ................ | G06F 1/1607 |
| 2002/0001032 A1* | 1/2002 | Ohki | ................ | H04N 1/00323 |
| | | | | 348/241 |
| 2008/0136973 A1* | 6/2008 | Park | ..................... | G06F 1/1616 |
| | | | | 348/744 |
| 2021/0200266 A1* | 7/2021 | Franke | ................ | H05K 5/0234 |
| 2022/0004223 A1* | 1/2022 | Franke | ................ | H05K 5/0017 |

* cited by examiner

ELECTRONIC DEVICE ASSEMBLY

CROSS-REFERENCE TO RELATED APPLICATION

This application is a divisional application of and claims the priority benefit of U.S. application Ser. No. 16/905,922, filed on Jun. 19, 2020, which claims the priority benefit of Taiwan application serial no. 109200733, filed on Jan. 17, 2020. The entirety of each of the above-mentioned patent applications is hereby incorporated by reference herein and made a part of this specification.

BACKGROUND

Technical Field

The disclosure relates to a device assembly, and more particularly, to an electronic device assembly.

Related Art

In order to maximize a screen-to-body ratio of electronic devices, slim border design has become a trend in recent years. Thus, the space above a display screen, which was reserved for placing a lens, has to be sacrificed.

The border is used to hide wires therein and provide enough space for the lens. However, there are fears that the lens fixed above the display screen may cause privacy leakage.

SUMMARY

The disclosure provides an electronic device assembly, in which a detachable lens module is detachably assembled to an electronic device body for use as needed.

The electronic device assembly of the disclosure includes an electronic device body and a detachable lens module. The electronic device body has a housing and a first joining unit, wherein the first joining unit is disposed on the housing. The detachable lens module is detachably assembled onto the housing and has a second joining unit, wherein the first joining unit is joined to the second joining unit to electrically connect the detachable lens module to the electronic device body.

In an embodiment of the disclosure, the electronic device body is a notebook computer or a tablet computer.

In an embodiment of the disclosure, the first joining unit includes a plurality of pads exposed from a surface of the housing. An electroplating layer is provided on the pads, and the electroplating layer is of the same color as the housing. The second joining unit includes a plurality of metal domes. The electronic device assembly further includes a pair of magnets, wherein one of the magnets is disposed in the housing, the other of the magnets is disposed in the detachable lens module, and the detachable lens module is fixed to the housing through magnetic attraction between the magnets.

In an embodiment of the disclosure, the housing has a plurality of open holes, the first joining unit has a plurality of contacts disposed corresponding to the open holes, the second joining unit has a plurality of spring needles, and the spring needles are correspondingly inserted into the open holes to contact the contacts.

In an embodiment of the disclosure, the housing has a recess, the first joining unit is a port disposed in the recess, the second joining unit is gold fingers, and the second joining unit is inserted into the recess to be joined to the first joining unit.

In an embodiment of the disclosure, the detachable lens module further has a tongue part, and the tongue part and the second joining unit are located on opposite sides of the detachable lens module.

In an embodiment of the disclosure, the housing further has an accommodation slot, and the accommodation slot is configured to accommodate the detachable lens module when the detachable lens module is not in use.

Based on the above, by disposing the first joining unit and the second joining unit, the detachable lens module may be accommodated when not in use, and the detachable lens can be driven for use by connecting the first joining unit with the second joining unit.

DESCRIPTION OF THE EMBODIMENTS

Figure 1A:
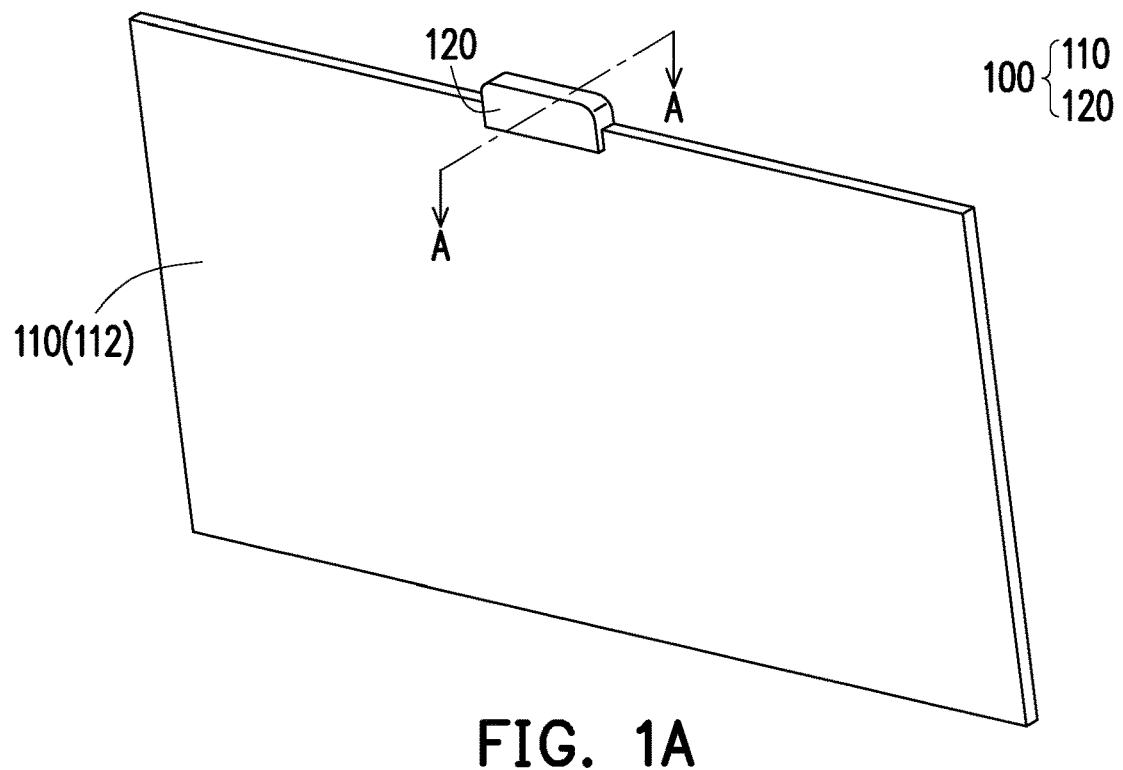
FIG. 1A is a schematic view of an electronic device assembly.
Figure 1B:
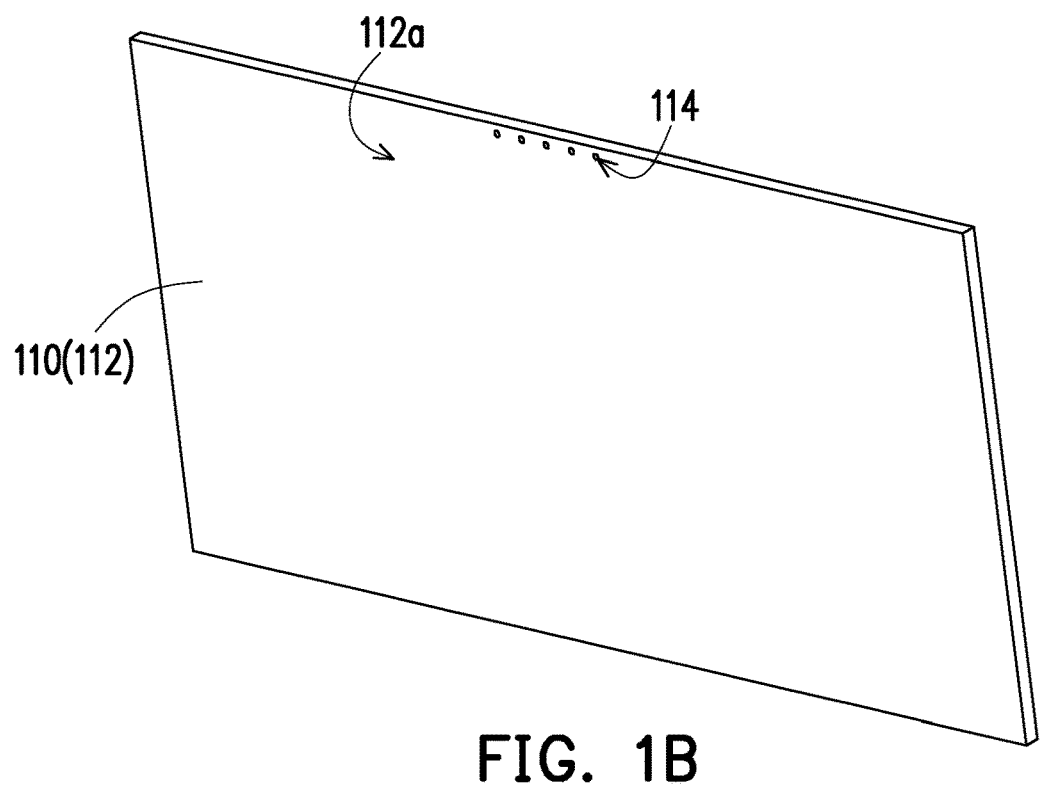
FIG. 1B is a schematic view of an electronic device body.

FIG. 1A is a schematic view of an electronic device assembly, and FIG. 1B is a schematic view of an electronic device body. An electronic device assembly 100 includes an electronic device body 110 and a detachable lens module 120. Referring to FIG. 1A and FIG. 1B together, the electronic device body 110 may be a notebook computer or a tablet computer and has a housing 112 and a first joining unit 114, wherein the first joining unit 114 is disposed on the housing 112.

In the present embodiment, the first joining unit 114 may be a plurality of pads exposed from a surface (back surface) 112a of the housing 112. Moreover, to make the housing 112 of the electronic device body 110 appear uniform in color, an electroplating layer 116 may further be formed on the pads, and the electroplating layer 116 is of the same color as the housing 112.

The detachable lens module 120 is detachably assembled onto the housing 112, wherein the detachable lens module 120 may be assembled onto the housing 112 through structural adaptation (e.g., combination of concave and convex structures), fitting, clamping or magnetic attraction. Those skilled in the art may achieve easy assembly or detachment of the detachable lens module 120 to or from the housing 112 through a structural design or the use of an additional component, according to actual needs.

Figure 2A:
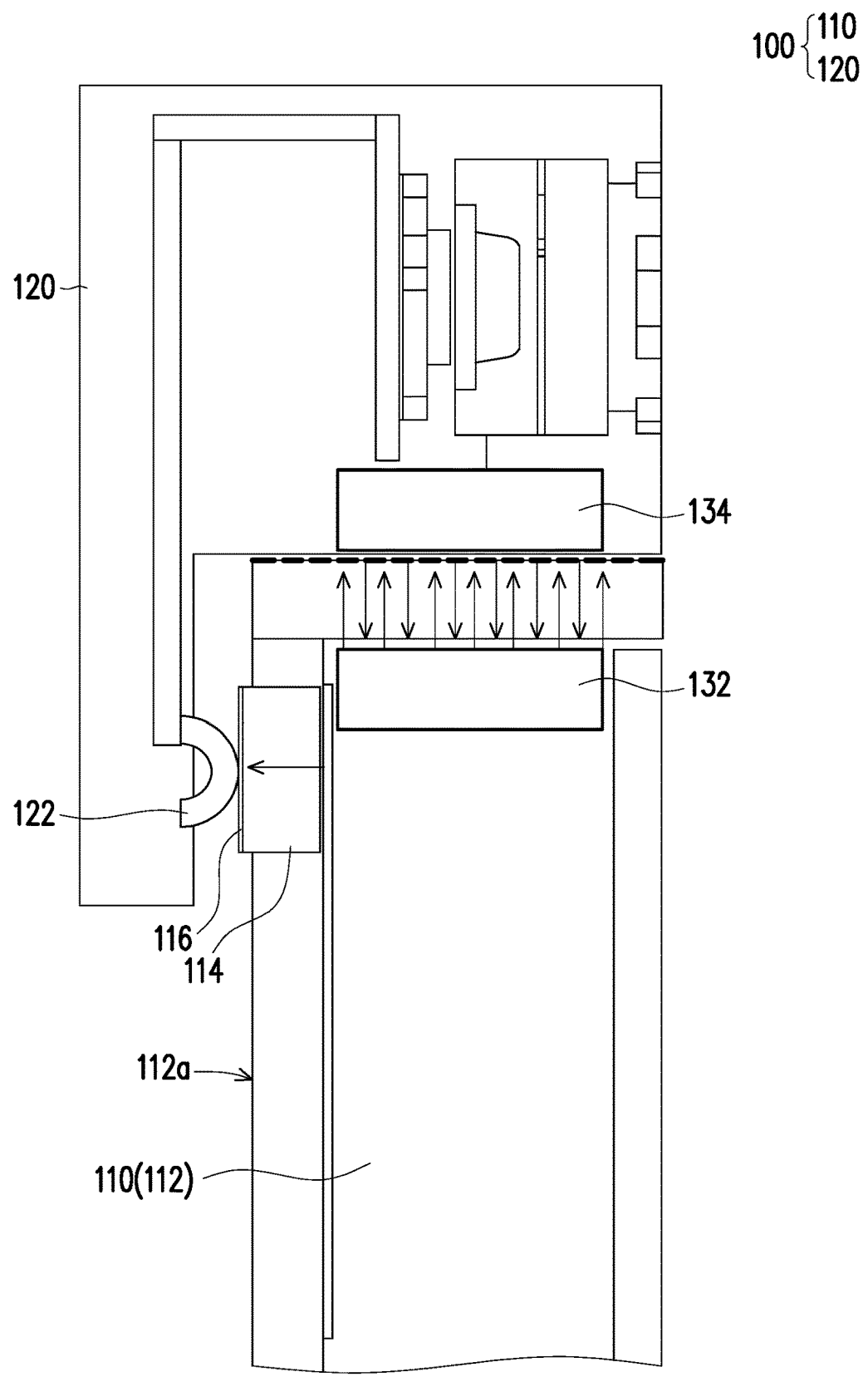
FIG. 2A is a schematic partial cross-sectional view along line A-A of FIG. 1A, showing that a detachable lens module is clamped on a housing.
Figure 2B:
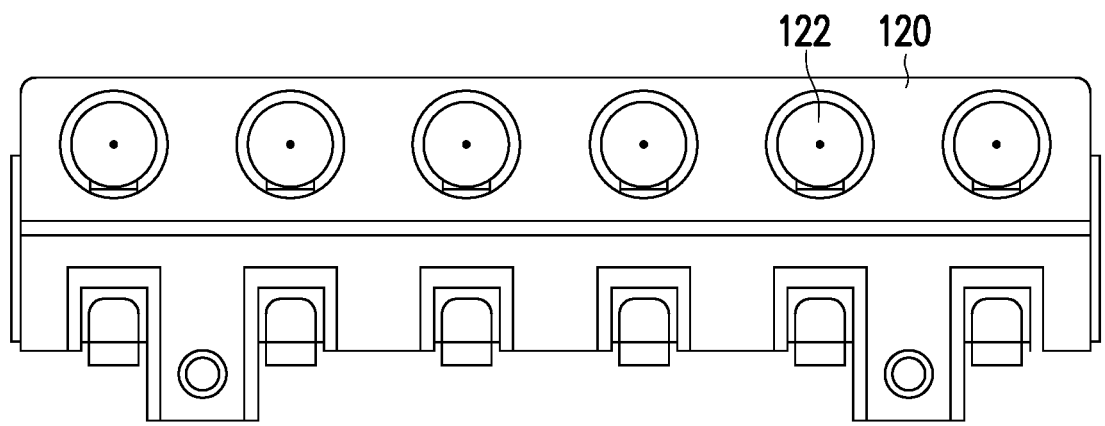
FIG. 2B is a schematic view of a second joining unit of the detachable lens module.
Figure 2C:
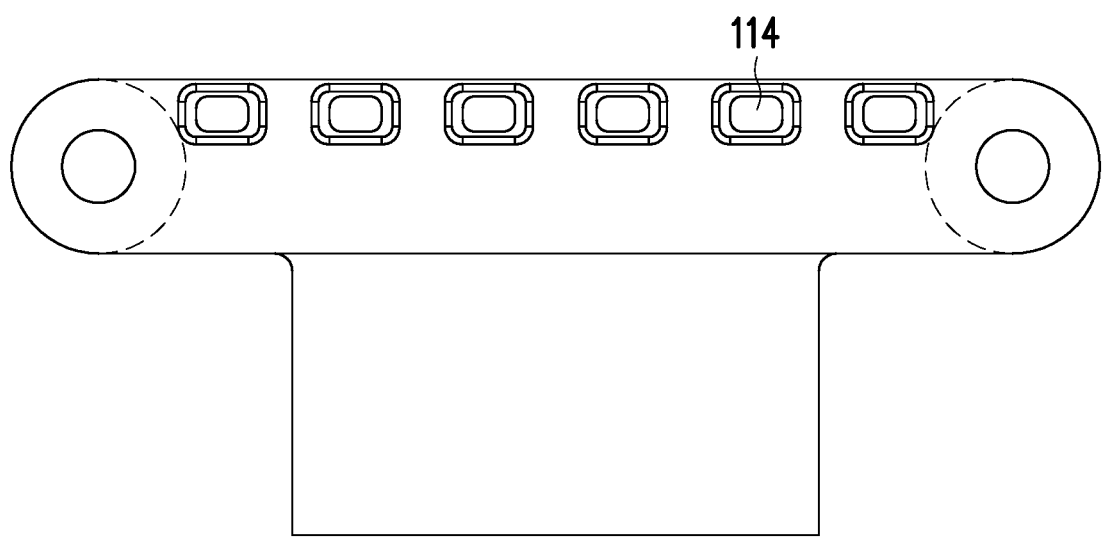
FIG. 2C is a schematic view of a first joining unit of the electronic device body of FIG. 1B.

FIG. 2A is a schematic partial cross-sectional view along line A-A of FIG. 1A, showing that a detachable lens module is clamped on a housing, FIG. 2B is a schematic view of a second joining unit of the detachable lens module, and FIG. 2C is a schematic view of a first joining unit of the electronic device body of FIG. 1B. Referring to FIG. 2A, FIG. 2B, and FIG. 2C together, the detachable lens module 120 has a second joining unit 122, wherein the second joining unit 122 includes a plurality of metal domes. Specifically, the second joining unit 122 is formed of the metal domes, wherein the metal domes are bent or stamped into an arc shape in cross section. In this way, when the detachable lens module 120 is assembled onto the housing 112, the second joining unit 122 being metal domes is in good contact with the first joining unit 114 being pads, such that the detachable lens module 120 is electrically connected to the electronic device body 110.

Additionally, in the case of using metal domes as the second joining unit 122, when the second joining unit 122 contacts the first joining unit 114 to form the electrical connection, wear and tear during the assembly or detachment of the detachable lens module 120 to or from the housing 112, which result from scraping between the second joining unit 122 and the first joining unit 114, can be avoided.

The electronic device assembly 100 may further include a pair of magnets 132 and 134, wherein the magnet 132 may be disposed in the housing 112 and the magnet 134 may be disposed in the detachable lens module 120. Through magnetic attraction between the magnets 132 and 134, the detachable lens module 120 is easily assembled and fixed to the housing 112.

Although in the present embodiment, an example is given in which the electronic device assembly 100 has one pair of magnets 132 and 134, those skilled in the art should be able to deduce that the number of magnets is not limited to one pair but can be changed according to needs.

Specifically, in a case where the housing 112 of the electronic device body 110 is made of metal, the magnets may only be disposed in the detachable lens module 120 and not in the housing 112 of the electronic device body 110. In another case where a casing of the detachable lens module 120 is made of a magnetically permeable material, the magnets may only be disposed in the housing 112 of the electronic device body 110. Of course, it is also possible to add magnetically permeable particles to a non-magnetic material (e.g., plastic) for the housing 112 of the electronic device body 110 or the casing of the detachable lens module 120. In this way, the housing 112 of the electronic device body 110 or the casing of the detachable lens module 120 can become magnetic even though it is not made of metal.

In the case where the detachable lens module 120 is assembled to the housing 112 of the electronic device body 110 by means of magnetic attraction, a user can easily detach the detachable lens module 120 from the housing 112 of the electronic device body 110 for accommodation simply by applying a force greater than the magnetic attraction force. In this way, a situation can be avoided in which the detachable lens module 120 is constantly disposed on the housing 112 of the electronic device body 110 and thus results in privacy leakage.

Figure 3A:
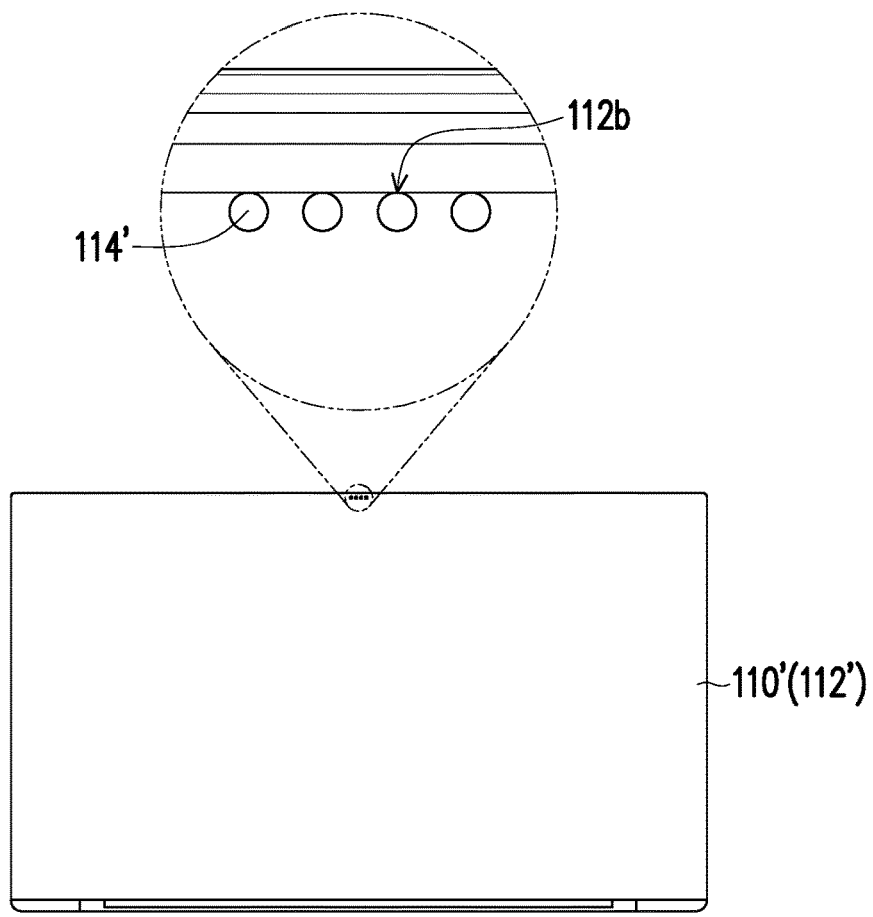
FIG. 3A is a schematic view of an electronic device body according to another embodiment of the disclosure.
Figure 3B:
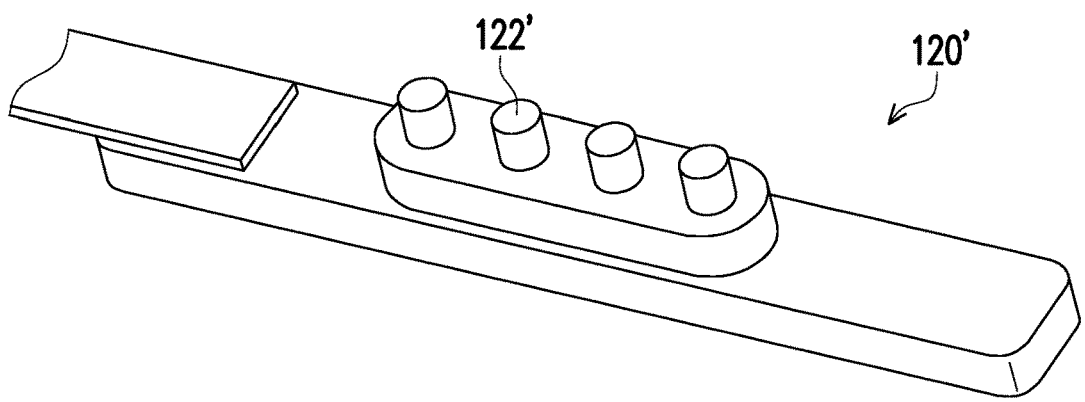
FIG. 3B is a schematic view of a detachable lens module.

FIG. 3A is a schematic view of an electronic device body according to another embodiment of the disclosure, and FIG. 3B is a schematic view of a detachable lens module. Referring to FIG. 3A and FIG. 3B together, in the present embodiment, a housing 112' of an electronic device body 110' has a plurality of open holes 112b, and a first joining unit 114' is disposed in the electronic device body 110', the first joining unit 114' being a plurality of contacts disposed corresponding to the open holes 112b. A second joining unit 122' of the detachable lens module 120' is a plurality of spring needles. When the detachable lens module 120' is assembled onto the housing 112' of the electronic device body 110', the spring needles are correspondingly inserted into the open holes 112b to contact the contacts so that the detachable lens module 120' is electrically connected to the electronic device body 110'.

Figure 4A:
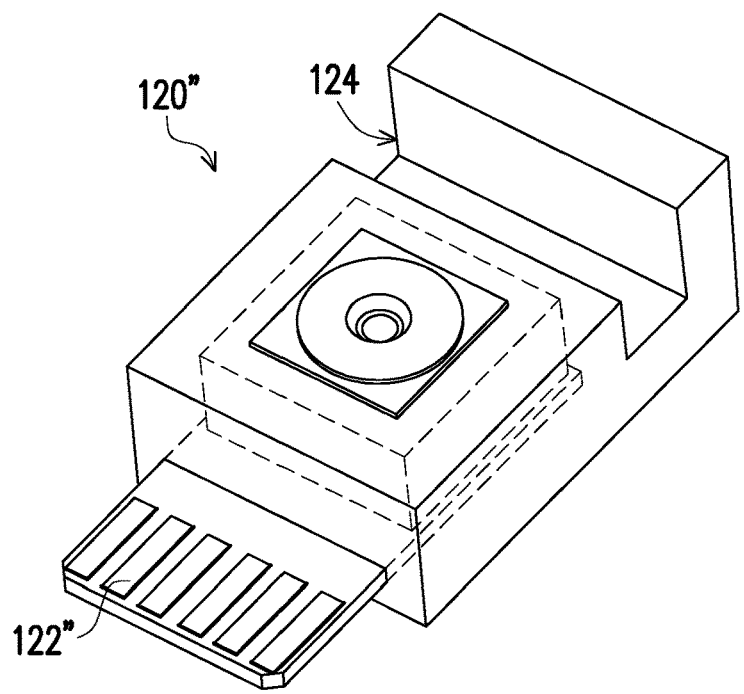
FIG. 4A is a schematic view of a detachable lens module according to still another embodiment of the disclosure.
Figure 4B:
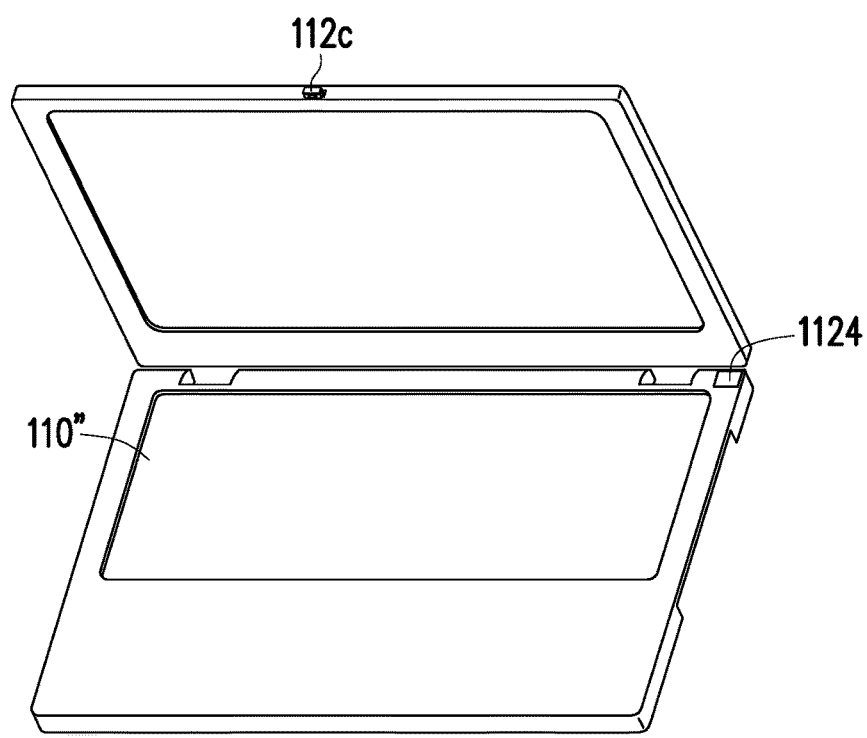
FIG. 4B is a schematic view showing that the detachable lens module is accommodated in an electronic device body.
Figure 4C:
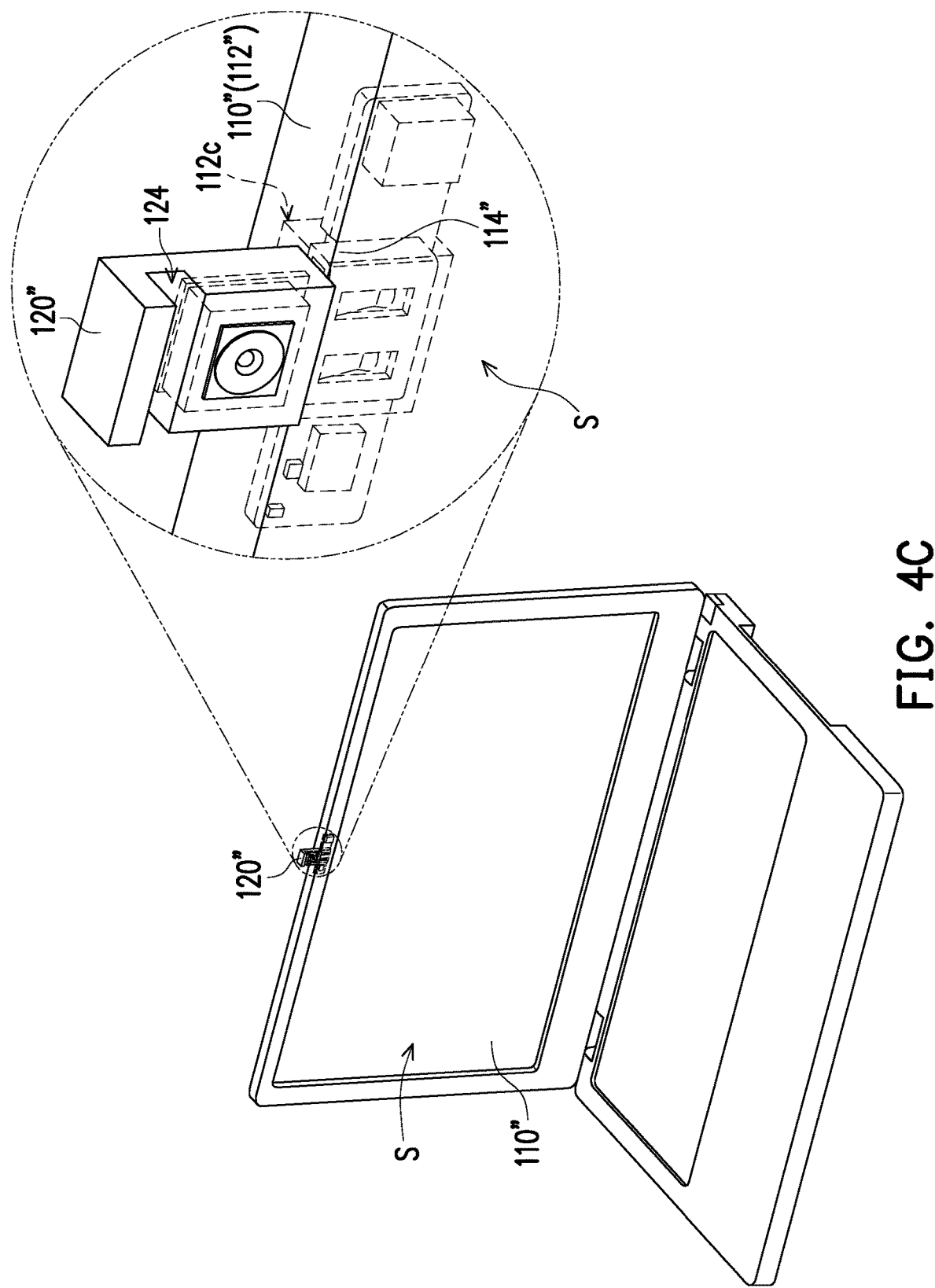
FIG. 4C is a schematic view showing that the detachable lens module is assembled onto the electronic device body for use.

FIG. 4A is a schematic view of a detachable lens module according to still another embodiment of the disclosure, FIG. 4B is a schematic view showing that the detachable lens module is accommodated in an electronic device body, and FIG. 4C is a schematic view showing that the detachable lens module is assembled onto the electronic device body for use. Referring to FIG. 4A, FIG. 4B and FIG. 4C together, unlike the foregoing embodiments, a housing 112" has a recess 112c, a first joining unit 114" is a port disposed in the recess 112c, a second joining unit 122" is gold fingers, and the second joining unit 122" is inserted into the recess 112c to be joined to the first joining unit 114".

Specifically, the housing 112" further has an accommodation slot 112d, such that the detachable lens module 120" may be accommodated in the accommodation slot 112d when not in use. The detachable lens module 120" further has a tongue part 124, and the tongue part 124 and the second joining unit 122" are located on opposite sides of the detachable lens module 120".

When the detachable lens module 120" is accommodated in the accommodation slot 112d, since the detachable lens module 120" is not powered, the possibility of the detachable lens module 120" being turned on is reduced. In addition, since the detachable lens module 120" is entirely accommodated in the accommodation slot 112d, its lens is covered by a wall of the accommodation slot 112d, and thus, there is no fear of privacy leakage.

To use the lens module, the user may move the tongue part 124 with their finger to remove the detachable lens module 120" from the accommodation slot 112d.

Then, the user may insert the second joining unit 122" of the detachable lens module 120" into the recess 112c to join the second joining unit 122" to the first joining unit 114" disposed in the recess 112c, so that the detachable lens module 120" is electrically connected to the electronic device body 110".

Figure 4D:
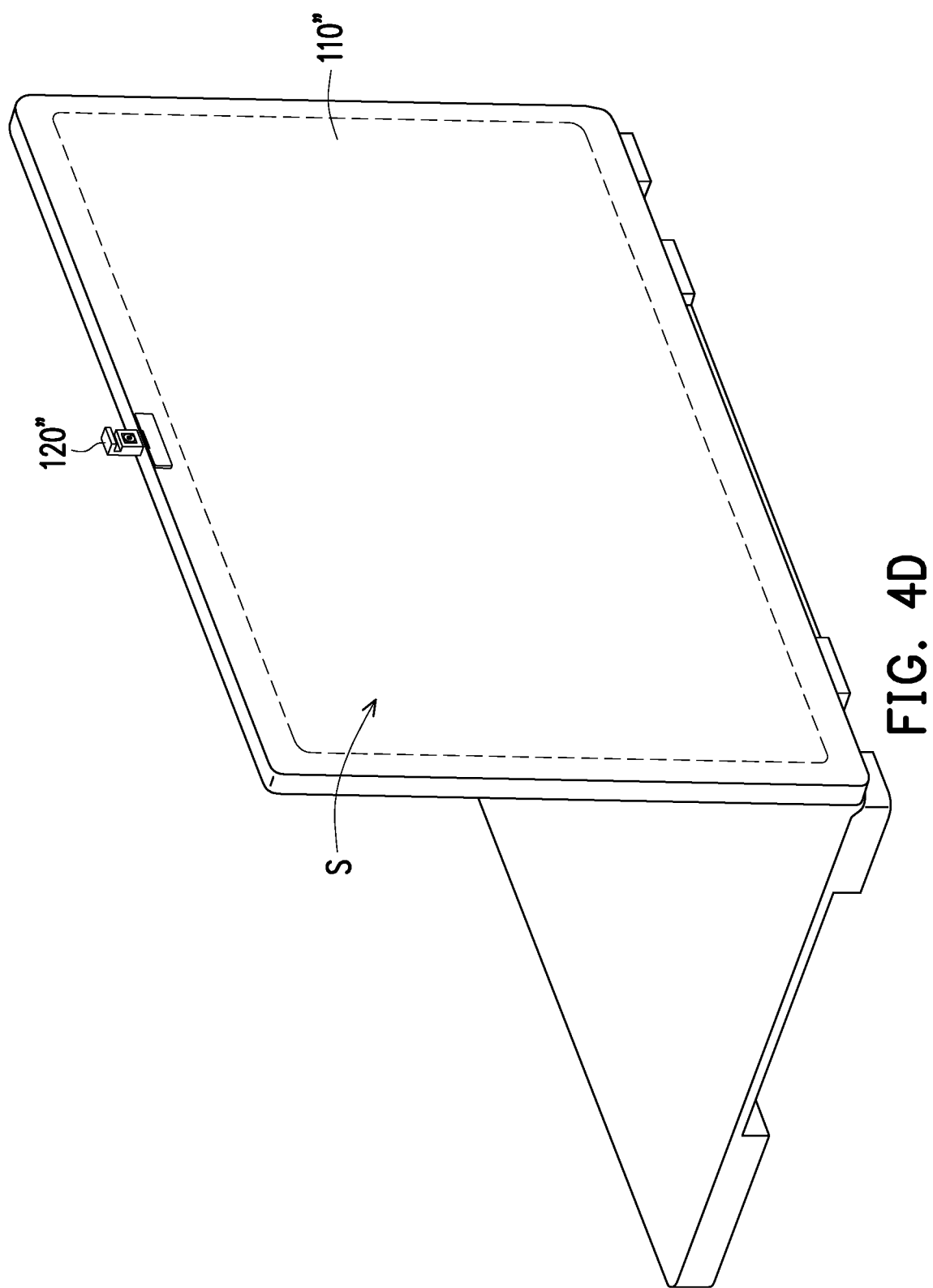
FIG. 4D is a schematic view showing that the detachable lens module is assembled in an opposite direction onto the electronic device body.

FIG. 4D is a schematic view showing that the detachable lens module 120" is assembled in an opposite direction onto the electronic device body. Referring to FIG. 4C and FIG. 4D together, particularly, the use of the gold fingers allows flexibility in the insertion direction of the detachable lens module 120. Specifically, the detachable lens module 120" may be inserted in the same direction as a display screen S to face the user (as shown in FIG. 4C) for performing video communication, selfie taking and so on. As needed, the detachable lens module 120" may be inserted back to the display screen S to realize functions such as video recording, picture taking and so on (as shown in FIG. 4D).

Of course, the detachable lens module 120" can be assembled onto the electronic device body 110" in different directions not only in the embodiments as shown in FIG. 4A to FIG. 4D, but also in the foregoing embodiments of FIG. 1A to FIG. 2C and FIG. 3A and FIG. 3B through adaptive modification of the structure.

In summary, in the electronic device assembly of the disclosure, by disposing the first joining unit and the second joining unit, the detachable lens module may be accommodated when not in use, and the detachable lens can be driven for use by connecting the first joining unit with the second joining unit. Therefore, during non-use of the detachable lens module, it can be prevented that the electronic device body is hacked to open the lens and cause privacy leakage.

What is claimed is:

1. An electronic device assembly comprising:
   an electronic device body having a housing and a first joining unit, wherein the first joining unit is disposed on the housing; and
   a detachable lens module detachably assembled onto the housing and having a second joining unit, wherein the first joining unit is joined to the second joining unit to electrically connect the detachable lens module to the electronic device body, wherein the housing has a plurality of open holes, the first joining unit has a plurality of contacts disposed corresponding to the plurality of open holes, the second joining unit has a plurality of spring needles, and the plurality of spring needles are correspondingly inserted into the plurality of open holes to contact the plurality of contacts.

2. The electronic device assembly according to claim 1, wherein the electronic device body is a notebook computer or a tablet computer.

3. The electronic device assembly according to claim 1, wherein the housing further has an accommodation slot, and the accommodation slot is configured to accommodate the detachable lens module when the detachable lens module is not in use.

* * * * *